(12) United States Patent
Takahashi et al.

(10) Patent No.: US 9,048,024 B2
(45) Date of Patent: Jun. 2, 2015

(54) SOLID ELECTROLYTIC CAPACITOR AND METHOD FOR PRODUCING THE SAME

(75) Inventors: Masanori Takahashi, Miyagi (JP); Satoshi Iwai, Miyagi (JP)

(73) Assignee: NEC Tokin Corporation, Miyagi (JP)

( * ) Notice: Subject to any disclaimer, the term of this patent is extended or adjusted under 35 U.S.C. 154(b) by 140 days.

(21) Appl. No.: 13/614,594

(22) Filed: Sep. 13, 2012

(65) Prior Publication Data

US 2013/0083455 A1  Apr. 4, 2013

(30) Foreign Application Priority Data

Sep. 29, 2011 (JP) ................. 2011-214770

(51) Int. Cl.
*H01G 11/56* (2013.01)
*H01G 9/025* (2006.01)
*H01G 9/15* (2006.01)

(52) U.S. Cl.
CPC .............. *H01G 9/025* (2013.01); *H01G 11/56* (2013.01); *H01G 9/15* (2013.01)

(58) Field of Classification Search
None
See application file for complete search history.

(56) References Cited

U.S. PATENT DOCUMENTS

| | | | |
|---|---|---|---|
| 5,586,000 A * | 12/1996 | Sakata et al. | 361/525 |
| 7,125,764 B2 | 10/2006 | Taketani et al. | |
| 2010/0302714 A1 * | 12/2010 | Kobayakawa et al. | 361/529 |
| 2011/0133546 A1 | 6/2011 | Jang et al. | |

FOREIGN PATENT DOCUMENTS

| | | |
|---|---|---|
| EP | 0 768 686 A2 | 4/1997 |
| JP | 11-121281 A | 4/1999 |
| JP | 2003-059763 A | 2/2003 |
| JP | 2010-3772 A | 1/2010 |
| JP | 2011-111521 A | 6/2011 |
| KR | 10-0208869 B1 | 7/1999 |
| TW | 200832468 A | 8/2008 |
| TW | 201131601 A | 9/2011 |

OTHER PUBLICATIONS

Office Action mailed Mar. 13, 2014 in related Taiwanese application No. 101135422 with partial English-language translation (7 pgs.).

* cited by examiner

*Primary Examiner* — Jenny L Wagner
*Assistant Examiner* — Dion R Ferguson
(74) *Attorney, Agent, or Firm* — Foley & Lardner LLP

(57) ABSTRACT

The present invention provides a solid electrolytic capacitor and a method producing the same, in which high reliability is realized and further in which the product yield is improved by suppressing the increase of ESR or the like. In the present invention, the electroconductive polymer layer includes first electroconductive polymer layer 3 and second electroconductive polymer layer 10, in which first electroconductive polymer layer 3 covers the surface of dielectric polymer 2, and the second electroconductive polymer layer is provided on a surface of first electroconductive polymer layer 3 covering the bottom surface and the side surfaces, and is provide with opening at least a part of the leading surface of first electroconductive polymer layer 3.

3 Claims, 3 Drawing Sheets

SOLID ELECTROLYTIC CAPACITOR AND METHOD FOR PRODUCING THE SAME

This application is based upon and claims the benefit of priority from Japanese patent application No. 2011-214770, filed on Sep. 29, 2011, the disclosure of which is incorporated herein in its entirety by reference.

BACKGROUND OF THE INVENTION

1. Field of the Invention

The present invention relates to a solid electrolytic capacitor and a method producing the same.

2. Description of the Related Art

In the past, since solid electrolytic capacitors using tantalum, aluminum, or the like have a large electrostatic capacity and an excellent frequency characteristic, they have been widely used for electronic devices such as portable electronic terminals and personal computers. In late years, with higher reliability and higher performance of the electronic device, requirements of leakage current (LC) reduction, lower equivalent series resistance (low ESR) and the like are further increased.

Here, a configuration of a conventional solid electrolytic capacitor is explained. FIG. 3 is a schematic cross-sectional view for explaining the configuration of the conventional solid electrolytic capacitor. Anode body 21 is a sintered body having a lot of fine pores (porous layer) obtained by forming and sintering fine particles of a valve action metal such as tantalum or aluminum. Anode lead 28 which comes to be an anode part, as well as anode body 21, includes a wire or the like of a valve action metal, and is led from the anode lead leading surface (leading surface) of anode body 21. Dielectric layer 22 of an oxide film is formed on the surface of anode body 21 and on the surface inside the polar layer. Further, solid electrolyte layer 23 is formed on the surface of dielectric layer 22. Insulation part 30 includes an epoxy resin and is placed at the base part of anode lead 28 so as to prevent an electrical short circuit by connecting solid electrolyte layer 23 to anode lead 28.

Graphite layer 24 and silver paste layer 25 as a cathode part are formed on the surface of solid electrolyte layer 23 to configure a capacitor element. Anode lead 28 and the cathode part of the capacitor element are electrically connected to lead frame 31 and lead frame 32 that are external electrode terminals by welding or with electroconductive adhesive 26. Then, an outer package including outer resin 29 is formed to obtain a solid electrolytic capacitor.

The solid electrolyte layer has a function to electrically connect the dielectric layer and the cathode part and to extract an electrostatic capacity of the dielectric layer. The solid electrolyte layer is one of the important constituents for obtaining electrical characteristic of the solid electrolytic capacitor, and the configuration, the production method and the like are studied. In the late years, a solid electrolytic capacitor using an electroconductive polymer layer including an electroconductive polymer as the solid electrolyte layer is produced.

For forming the electroconductive polymer layer, chemical oxidative polymerization method is conventionally used, in which the anode body (anode body element) where the dielectric layer is formed is immersed in a solution obtained by adding a monomer, a catalyst, oxidant that is a dopant and the like to a solvent, and in which it is polymerized on the surface of the dielectric layer. In chemical oxidative polymerization method, a solvent with a low viscosity which has a good permeability and easily permeates the detail of the porous layer is generally used to obtain an electroconductive polymer layer having a characteristic that the adhesion between the dielectric layer and a layer formed as the cathode part is made good, etc.

Also, as well as chemical oxidative polymerization method, a method with an electroconductive polymer suspension is used, too. The method with an electroconductive polymer suspension (electroconductive polymer suspension method) is a method in which the anode body element is immersed and impregnated to an electroconductive polymer suspension containing an electroconductive polymer which is preliminary polymerized and to which a dopant is added, and it is pulled up, and it is then dried by heating to form an electroconductive polymer layer. The electroconductive polymer layer obtained by this method has characteristics that the density is high and the heat resistance is good in comparison with the electroconductive polymer layer obtained by chemical oxidative polymerization method or the like, and that the electroconductive polymer layer can be quickly formed. The electroconductive polymer suspension used in this method and the production method is disclosed in claims 2 and 3, and paragraphs 0014 to 0028 of JP 11-121281 A.

As a condition of the electroconductive polymer layer formed on the dielectric layer by electroconductive polymer suspension method, as shown in FIG. 3 described above, there is a case in which the electroconductive polymer layer (solid electrolyte layer 23) also covers the surface of the leading surface. The example of the solid electrolytic capacitor having this configuration is disclosed in FIG. 1 and paragraph 0016 of JP 2010-3772 A.

As described above, although the electroconductive polymer layer obtained by chemical oxidative polymerization method easily permeates the detail of the porous layer because a solution with a low viscosity is used, the electroconductive polymer layer formed has a low density due to the solution character. Therefore, there is a concern that the electroconductive polymer layer is compressed by the mold forming of the outer resin, and that the dielectric layer is connected to the graphite layer, these result in occurring an electrical short circuit or increasing LC. Also, there is a concern that a gas (oxygen) easily permeates it because of the low density, and that the increase of ESR occurs by the oxidation inside the anode body.

Against these concerns, it is effective to form an electroconductive polymer layer by electroconductive polymer suspension method by which an electroconductive polymer layer with a high density is obtained. In other words, if an electroconductive polymer layer with a desired thickness can uniformly be formed on the surface of the anode body element, high reliability against the oxygen permeation and the pressure in mold forming can be realized. Therefore, a solid electrolytic capacitor obtained by forming an electroconductive polymer layer by using an electroconductive polymer suspension on the surface of the electroconductive polymer layer by chemical oxidative polymerization method is studied.

In the case where the electroconductive polymer layer with a high density is formed by using electroconductive polymer suspension method on the whole surface of the anode body element having the electroconductive polymer layer with a low density, a residual air or solvent inside the pore of the anode body element may be trapped. If the heating such as drying is carried out in this situation, there is a problem that the air or solvent may be expand to generate small delamination at the interface of the electroconductive polymer layer and the dielectric layer, and that the product yield is lowered by the increase of ESR or the like.

Thus, the object of the present invention is, by solving the above-mentioned problem, to provide a solid electrolytic capacitor and a method for producing the same, in which the increase of ESR is suppressed, in which high reliability is realized, and further in which the electrical short circuit or the like is suppressed and in which the product yield is improved.

SUMMARY OF THE INVENTION

In the present invention, a solid electrolytic capacitor and a method for producing the same are found, in which a second electroconductive polymer layer covers a bottom surface and side surfaces of an anode body element where a first electroconductive polymer layer is formed with opening at least a part of a leading surface of the first electroconductive polymer layer, by using an electroconductive polymer suspension with a high viscosity by electroconductive polymer suspension method, and in which high reliability is realized, and further in which the electrical short circuit or the like is suppressed and in which the product yield is improved.

That is, the solid electrolytic capacitor of the present invention includes:

a capacitor element, which is electrically connected to an external electrode terminal, including an anode body including a valve action metal containing a polar layer which has a leading surface for leading an anode lead, a bottom surface opposed to the leading surface, and side surfaces next to the leading surface and the bottom surface, a dielectric layer formed on a surface of the anode body, an electroconductive polymer layer formed on a surface of the dielectric layer, and a graphite layer and a silver paste layer sequentially formed on a surface of the electroconductive polymer layer; and an outer package formed by covering a whole surface with an insulating material;

wherein the electroconductive polymer layer includes a first electroconductive polymer layer and a second electroconductive polymer layer;

the first electroconductive polymer layer covers the surface of the dielectric polymer; and the second electroconductive polymer layer is provided on a surface of the first electroconductive polymer layer covering the bottom surface and the side surfaces, and is provided with opening at least a part of the leading surface of the first electroconductive polymer layer.

Also, the solid electrolytic capacitor of the present invention may include the first electroconductive polymer layer formed by chemical oxidative polymerization method or by electroconductive polymer suspension method, and the second electroconductive polymer layer formed by electroconductive polymer suspension method by which an electroconductive polymer layer with a higher density than that of the first electroconductive polymer layer can be obtained.

The solid electrolytic capacitor of the present invention may include an antioxidant layer between the second electroconductive polymer layer and the graphite layer and on at least a part of the leading surface on which the first electroconductive polymer layer is formed.

The method for producing a solid electrolytic capacitor of the present invention includes:

forming a dielectric layer on a surface of an anode body including a valve action metal containing a polar layer which has a leading surface for leading an anode lead, a bottom surface opposed to the leading surface, and side surfaces next to the leading surface and the bottom surface;

forming a first electroconductive polymer layer on a surface of the dielectric layer, forming a second electroconductive polymer layer on a surface of the first electroconductive polymer layer covering the bottom surface and the side surfaces with opening at least a part of the leading surface of the first electroconductive polymer layer, by immersion to an electroconductive polymer suspension and by drying, sequentially forming a graphite layer and a silver paste layer on a surface of the second electroconductive polymer layer to form a cathode part; and electrically connecting the anode lead and the cathode part to an external electrode terminal, and forming an outer package with an insulating material.

In the method for producing a solid electrolytic capacitor of the present invention, the first electroconductive polymer layer may be formed by chemical oxidative polymerization method or by electroconductive polymer suspension method, and the second electroconductive polymer layer may be formed by using an electroconductive polymer suspension with a higher viscosity than that of a solution used for forming the first electroconductive polymer layer.

The method for producing a solid electrolytic capacitor of the present invention may include forming an antioxidant layer by immersion or application of an antioxidant containing solution on the leading surface on which the first electroconductive polymer layer is formed and on a surface of the second electroconductive polymer layer and by drying.

In the method for producing a solid electrolytic capacitor of the present invention, the viscosity of the electroconductive polymer suspension with a higher viscosity is preferably 100 mPa·S or higher and 500 mPa·S or lower.

In the present invention, the first electroconductive polymer layer is formed on the surface of the dielectric layer by chemical oxidative polymerization method or by electroconductive polymer suspension method, using an electroconductive polymer suspension with a low viscosity, and further the second electroconductive polymer layer covers the bottom surface and the side surfaces of the first electroconductive polymer layer formed with opening at least a part of the leading surface of the first electroconductive polymer layer, by using an electroconductive polymer suspension with a high viscosity. According to the present invention, the solid electrolytic capacitor and the method producing the same can be provided, in which the increase of ESR is suppressed by preventing oxygen permeation from outside, in which it becomes easy to release residual air or the like at the time of heating, in which high reliability is realized, and further in which the electrical short circuit or the like is suppressed and in which the product yield is improved.

DETAILED DESCRIPTION OF THE PREFERRED EMBODIMENTS

The embodiment of the present invention is explained with reference to drawings.

Embodiment 1

Figure 1:
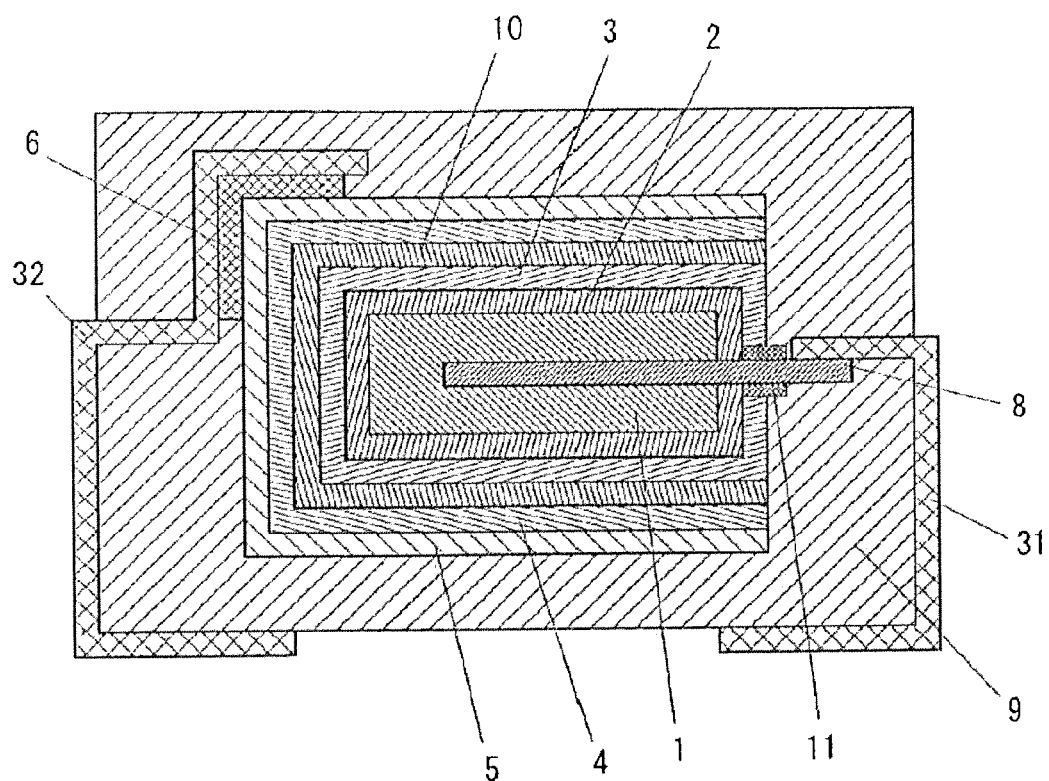
FIG. 1 is a schematic cross-sectional view for explaining the configuration of the solid electrolytic capacitor of Embodiment 1 of the present invention.

FIG. 1 is a schematic cross-sectional view for explaining the configuration of the solid electrolytic capacitor of Embodiment 1 of the present invention. The solid electrolytic capacitor of the present invention has anode body 1 including a sintered body of a valve action metal containing a polar layer, and it has a leading surface for leading anode lead 8. Dielectric layer 2 is formed on the surface of anode body 1 containing the polar layer.

Anode body 1 is formed with a sintered body including a valve action metal fine particle, a valve action metal which is subjected to a surface area enlargement treatment by etching to be polar layer, or the like. The valve action metal is appropriately selected from tantalum, aluminum, titanium, niobium, zirconium, or an alloy of these, or the like.

Dielectric layer 2 is a film by electrolytic oxidation of the surface of the valve action metal and is formed on the leading surface, side surfaces and bottom surface of anode body 1, and on the surface inside the polar layer. The thickness of dielectric layer 2 can be appropriately adjusted by the voltage of the electrolytic oxidation. Insulation part 11 is formed at the base part of anode lead 28 by applying an epoxy resin or the like.

Subsequently, first electroconductive polymer layer 3 is formed on the surface of dielectric layer 2. First electroconductive polymer layer 3 is formed by either chemical oxidative polymerization method or electroconductive polymer suspension method, and it is formed so that it covers the surface of dielectric layer 2.

Since first electroconductive polymer layer 3 shows a high conductivity, it contains, for example, a polymer of a monomer containing at least one or more selected from pyrrole, thiophene, aniline and derivatives thereof, and, in particular, it preferably contains pyrrole, 3,4-ethylenedioxy thiophene or derivatives thereof. In addition, a sulfone acid compound is preferably contained as a dopant because it develops a high conductivity.

Here, when first electroconductive polymer layer 3 is formed by electroconductive polymer suspension method, in order to make it easy to permeate the detail of the porous layer, it is desirable to use an electroconductive polymer suspension with a low viscosity of 1 mPa·S or higher and 90 mPa·S or lower.

Then, second electroconductive polymer layer 10 is formed on the surface of first electroconductive polymer layer 3. Second electroconductive polymer layer 10 is formed by electroconductive polymer suspension method, and covers the bottom surface and side surfaces of the anode body element where first electroconductive polymer layer 3 is formed with opening at least a part of the leading surface. In other words, the leading surface is not covered or the area other than the circumference of the base part which leads anode lead 8 is covered. This makes it easy to release a residual air or the like at the time of heating. Therefore, the solid electrolytic capacitor and the method producing the same can be provided, in which high reliability is realized, and further in which the electrical short circuit or the like is suppressed and in which the product yield is improved.

Here, in order to form an electroconductive polymer layer with a sufficient thickness on the bottom surface and side surfaces of the anode body element where first electroconductive polymer layer 3 is formed and to prevent oxygen permeation from outside as well as to absorb and relieve the pressure of mold forming, an electroconductive polymer suspension with a high viscosity of 100 mPa·S or higher and 500 mPa·S or lower is preferably used for forming second electroconductive polymer layer 10.

The electroconductive polymer suspension used in the present invention is mainly composed of a polymer containing at least one or more selected from pyrrole, thiophene, aniline and derivatives thereof and of a solvent containing a dopant. In particular, the polymer preferably contains pyrrole, 3,4-ethylenedioxy thiophene or derivatives thereof because it shows high electroconductivity.

The dopant is preferably, for example, a sulfone acid compound such as naphthalenesulfonic acid, benzenesulfonic acid, styrenesulfonic acid and derivatives thereof because it shows high electroconductivity.

The solvent may be water only and may be a mixed solvent containing an organic solvent which is soluble to water. The organic solvent is preferably a polar solvent such as dimethylformamide, dimethylacetamide, dimethylsulfoxide, ethyleneglycol, glycerin and sorbitol. This organic solvent is preferably added in an appropriate amount because it promotes the dissolution of the polymer in no small part and improves the film forming property.

Then, graphite layer 4 and silver paste layer 5 that comes to be a cathode part are formed on the surface of second electroconductive polymer layer 10 to obtain a capacitor element. Finally, the capacitor element were electrically connected to lead frame 31 and lead frame 32 which are external electrode terminals by welding or with electroconductive adhesive 6, and an outer package was formed with outer resin 9 to obtain a solid electrolytic capacitor of the present invention.

Embodiment 2

Figure 2:
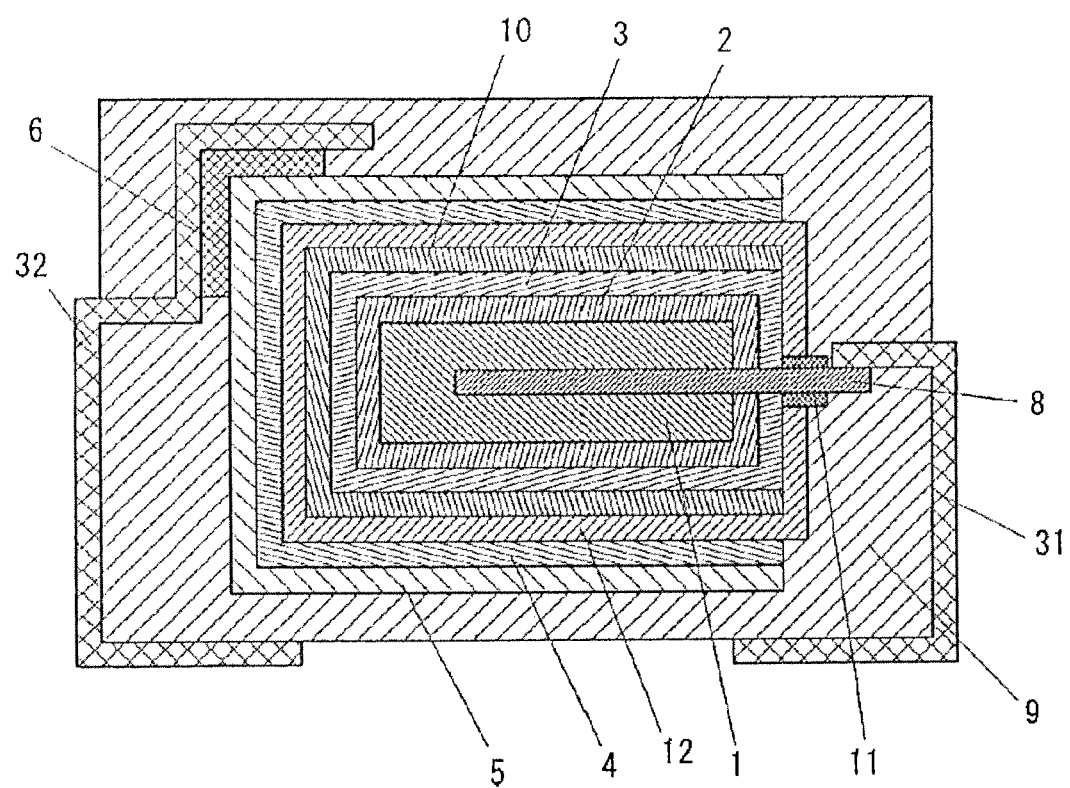
FIG. 2 is a schematic cross-sectional view for explaining the configuration of the solid electrolytic capacitor of Embodiment 2 of the present invention.
Figure 3:
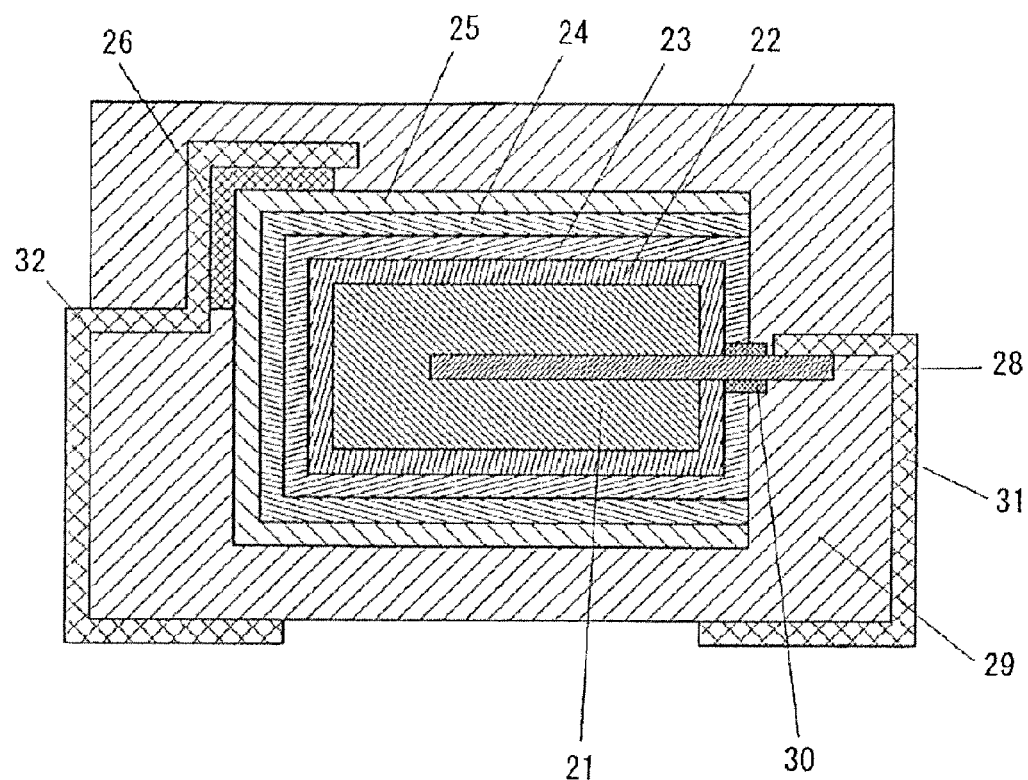
FIG. 3 is a schematic cross-sectional view for explaining the configuration of the conventional solid electrolytic capacitor.

FIG. 2 is a schematic cross-sectional view for explaining the configuration of the solid electrolytic capacitor of Embodiment 2 of the present invention. In the present invention, as shown in FIG. 2, in order to further improve reliability against a high temperature, antioxidant layer 12 may also be formed to the leading surface which leads anode lead 8 by immersing or applying an antioxidant containing solution to the leading surface and by drying after second electroconductive polymer layer 10 is formed. The configuration of anode body 1, dielectric layer 2, first electroconductive polymer layer 3, second electroconductive polymer layer 10 and insulation part 11 is the same as that of Embodiment 1, and thereby the explanation is omitted.

As the antioxidant, an antioxidant which is generally used for plastic can be used, but it preferably contains at least one compound selected from the group consisting of phenolic compounds, benzophenone compounds, salicylic acid compounds and benzotriazole compounds because of the high antioxidant property.

Then, graphite layer 4 and silver paste layer 5 that comes to be a cathode part are formed on the surface of antioxidant layer 12 to obtain a capacitor element. Finally, the capacitor element were electrically connected to lead frame 31 and lead frame 32 which are external electrode terminals by welding or with electroconductive adhesive 6, and an outer package was formed with outer resin 9 to obtain a solid electrolytic capacitor of the present invention.

EXAMPLES

As follows, Examples 1 and 2 of the present invention are explained.

Example 1

A pressed body, in which a tantalum wire with a diameter of 0.4 mm as an anode lead was embedded in a cuboid using a tantalum powder (approximately 30,000 CV/g) with a length of 3.5 mm, a width of 3.0 mm and a height of 1.5 mm, was sintered at approximately 1,500° C. to produce an anode body having a polar layer which led the anode lead. Electrolytic oxidation was carried out by applying a voltage of 30 V to this anode lead in a phosphoric acid aqueous solution to form a dielectric layer.

Then, the anode body coated with the dielectric layer was immersed in an aqueous solution containing ammonium peroxodisulfate and 1,3,6-naphthalene trisulfonic acid as an oxidant and was dried at room temperature. After that, it was immersed in 3,4-ethylenedioxy thiophene and was further kept at room temperature to polymerize 3,4-ethylenedioxy thiophene. A series of these polymerization operations were repeated 4 times to form a first electroconductive polymer layer including an electroconductive poly-3,4-ethylenedioxy thiophene by chemical oxidative polymerization method. The thickness of the first electroconductive polymer layer was set to be 12 μm. The first electroconductive polymer layer was compressed after carrying out a mold forming, and the thickness became approximately ⅓.

Subsequently, the anode body element where the first electroconductive polymer layer was formed was washed with ethanol and was dried. After that, the bottom surface and the side surfaces of the anode body element was immersed in an electroconductive polymer suspension in which the leading surface was controlled not to be immersed in the electroconductive polymer suspension, and it was pulled up. This operation was carried out once. In this Example, as an electroconductive polymer suspension, an aqueous solution obtained by mixing a poly-3,4-ethylenedioxy thiophene and polystyrene sulfonic acid in a concentration of 4% by mass with a viscosity of approximately 200 mPa·S (hereinafter, electroconductive polymer suspension A) was used. Then, it was dried at 125° C. for 1 hour to obtain a finished second electroconductive polymer layer by electroconductive polymer suspension method. The thickness of the second electroconductive polymer layer was set to be 15 μm.

After that, a graphite layer and a silver paste layer were formed using electroconductive pastes such as a graphite paste and a silver paste. Then, lead frames were connected respectively to the silver paste layer and the anode lead, and an outer package was formed around the whole with an outer resin by forming to obtain a solid electrolytic capacitor.

Example 2

In Example 2, electroconductive polymer suspension method was also used for forming a first electroconductive polymer layer.

The anode body element was immersed in an electroconductive polymer suspension until the solution reached the insulation part and was dried at 125° C. for 20 minutes. The operations were repeated 3 times to form a first electroconductive polymer layer. The thickness of the first electroconductive polymer layer was set to be 5 μm.

In this Example, as an electroconductive polymer suspension, an aqueous solution obtained by mixing a poly-3,4-ethylenedioxy thiophene and polystyrene sulfonic acid in a concentration of 2% by mass with a viscosity of approximately 30 mPa·S was used. The following processes were the same as those in Example 1.

Then, Example 3 of the present invention is concretely explained.

Example 3

The operations until a second electroconductive polymer layer was formed were carried out in the same manner as in Example 1, and the anode body element where the first and second electroconductive polymer layers were formed was completely immersed in an antioxidant containing aqueous solution. After that, it was dried at 125° C. for 30 minutes to obtain an antioxidant layer. A commercial phenolic compound was used as the antioxidant. The content of the phenolic compound in the aqueous solution was set to be 10% by mass. The thickness of the antioxidant layer was set to be 1 μm. The following processes after forming a graphite layer were also the same as those in Example 1.

Comparative Example 1

3,4-ethylenedioxy thiophene was used as a monomer and an electroconductive polymer layer was formed only by chemical oxidative polymerization method. That is, the anode body element was immersed in an aqueous solution containing ammonium peroxodisulfate and 1,3,6-naphthalene trisulfonic acid as an oxidant and was then dried at room temperature. After that, it was immersed in a liquid containing 3,4-ethylenedioxy thiophene and was further kept at room temperature to polymerize 3,4-ethylenedioxy thiophene. These polymerization operations were repeated 10 times to form an electroconductive polymer layer including an electroconductive poly-3,4-ethylenedioxy thiophene. The operations except for the formation of the electroconductive polymer layer were the same as those in Example 1. The thickness of the electroconductive polymer layer was set to be 30 μm. The electroconductive polymer layer of Comparative Example 1 was compressed after carrying out a mold forming, and the thickness became approximately ⅓.

Comparative Example 2

A first electroconductive polymer layer was formed in the same manner as in Example 1. Subsequently, the anode body element obtained by forming the first electroconductive polymer layer was immersed in electroconductive polymer suspension A until the solution reached the insulation part and was then dried at 125° C. for 20 minutes. That is, the second electroconductive polymer layer was formed on a surface including the anode lead and the insulation part. The other configuration was the same as those in Example 1.

200 solid electrolytic capacitors were produced respectively under the conditions of Examples 1, 2 and 3, and Comparative Examples 1 and 2. TABLE 1 shows the product yields after LC examination during the producing process, the initial ESRs, and the increase rates of ESR after heating test at 125° C. for 1,000 hours. The measuring frequency of ESR was set to be 100 kHz and the applied voltage at the time of LC measurement was set to be 20 V. ESR and LC were measured according to JIS C 5101-1.

TABLE 1

|  | product yield (%) | initial ESR (mΩ) | (n = 200) increase rate of ESR after heating test (%) |
| --- | --- | --- | --- |
| Ex. 1 | 99.0 | 32.5 | 35 |
| Ex. 2 | 99.5 | 34.8 | 22 |
| Ex. 3 | 99.0 | 33.6 | 18 |
| Comp. Ex. 1 | 97.0 | 35.1 | 96 |
| Comp. Ex. 2 | 65.0 | 31.3 | 20 |

In the solid electrolytic capacitors of Examples 1 to 3 in TABLE 1, the product yield was improved more than that in the solid electrolytic capacitor obtained in Comparative Example 2, in which the second electroconductive polymer layer was formed in the whole area. Also, in the solid electrolytic capacitors of Examples 1 to 3 in TABLE 1, the increase of ESR was suppressed more than that in the solid electrolytic capacitor obtained in Comparative Example 1, in which the electroconductive polymer layer was formed only by chemical oxidative polymerization method. By these, the advantageous effect of the present invention can be confirmed.

The embodiment of the present invention was explained using the Examples in the above, but the present invention is not limited to the Examples and includes an embodiment after changing a design within a scope of the present invention. That is, the present invention includes an embodiment after various changings or modifications which can be made by a person ordinarily skilled in the art.

What is claimed is:

1. A solid electrolytic capacitor, comprising:
  a capacitor element, which is electrically connected to an external electrode terminal, comprising
    an anode body comprising a valve action metal containing a polar layer which has a leading surface for leading an anode lead, a bottom surface opposed to the leading surface, and side surfaces next to the leading surface and the bottom surface,
    a dielectric layer formed on a surface of the anode body,
    an electroconductive polymer layer formed on a surface of the dielectric layer, and
    a graphite layer and a silver paste layer sequentially formed on a surface of the electroconductive polymer layer; and
  an outer package formed by covering a whole surface with an insulating material;
  wherein
    the electroconductive polymer layer comprises a first electroconductive polymer layer and a second electroconductive polymer layer;
    the first electroconductive polymer layer covers the surface of the dielectric polymer; and
    the second electroconductive polymer layer is provided on a surface of the first electroconductive polymer layer covering the bottom surface and the side surfaces, and is provided with opening at least a part of the leading surface of the first electroconductive polymer layer; and
    the second electroconductive polymer layer is not disposed over the leading surface of the anode body.

2. The solid electrolytic capacitor according to claim 1, comprising the first electroconductive polymer layer formed by chemical oxidative polymerization method or by electroconductive polymer suspension method, and the second electroconductive polymer layer formed by electroconductive polymer suspension method by which an electroconductive polymer layer with a higher density than that of the first electroconductive polymer layer can be obtained.

3. The solid electrolytic capacitor according to claim 1, comprising an antioxidant layer between the second electroconductive polymer layer and the graphite layer and on at least a part of the leading surface on which the first electroconductive polymer layer is formed.

* * * * *